United States Patent
Moratz

(10) Patent No.: US 9,239,078 B2
(45) Date of Patent: Jan. 19, 2016

(54) PHENOLIC BEARING CAGE WITH SELF-LUBRICATING COATING AND METHOD OF MANUFACTURING PHENOLIC BEARING CAGE WITH SELF-LUBRICATING COATING

(71) Applicant: Schaeffler Technologies GmbH & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/534,734

(22) Filed: Nov. 6, 2014

(65) Prior Publication Data

US 2015/0139581 A1 May 21, 2015

Related U.S. Application Data

(60) Provisional application No. 61/904,808, filed on Nov. 15, 2013.

(51) Int. Cl.
 *F16C 33/44* (2006.01)
 *F16C 33/56* (2006.01)
 *F16C 33/66* (2006.01)

(52) U.S. Cl.
 CPC ........... *F16C 33/565* (2013.01); *F16C 33/6696* (2013.01)

(58) Field of Classification Search
 CPC .............................. F16C 33/445; F16C 33/565
 USPC .................................. 384/463, 470, 527, 573
 See application file for complete search history.

(56) References Cited

U.S. PATENT DOCUMENTS

| | | | | |
|---|---|---|---|---|
| 3,500,525 A | | 3/1970 | Glenn | |
| 3,923,352 A | * | 12/1975 | Pentlicki | 384/446 |
| 5,486,052 A | * | 1/1996 | Sibley et al. | 384/463 |
| 7,846,506 B1 | | 12/2010 | Bhattacharya et al. | |
| 2006/0210208 A1 | * | 9/2006 | Ota et al. | 384/527 |
| 2008/0304781 A1 | | 12/2008 | Hofmann et al. | |
| 2009/0304321 A1 | | 12/2009 | Horton et al. | |

FOREIGN PATENT DOCUMENTS

| | | |
|---|---|---|
| EP | 0695884 | 2/1996 |
| GB | 826091 | 12/1959 |
| JP | 62141314 | 6/1987 |
| JP | 03255223 | 11/1991 |
| JP | 06109022 | 4/1994 |
| KR | 1020040003922 | 1/2004 |

* cited by examiner

*Primary Examiner* — Phillip A Johnson
(74) *Attorney, Agent, or Firm* — Simpson & Simpson, PLLC

(57) ABSTRACT

A bearing cage, including: a body fabricated of phenolic material and having an outer circumferential surface and an inner circumferential surface; and a coating of molybdenum disulfide or polytetrafluoroethylene adhered to the outer circumferential surface or the inner circumferential surface. A method of manufacturing a bearing cage, including: fabricating a body from phenolic material, the body including an outer circumferential surface and an inner circumferential surface connecting first and second sides; and adhering a coating of molybdenum disulfide or polytetrafluoroethylene to the inner or outer circumferential surface.

11 Claims, 5 Drawing Sheets

PHENOLIC BEARING CAGE WITH SELF-LUBRICATING COATING AND METHOD OF MANUFACTURING PHENOLIC BEARING CAGE WITH SELF-LUBRICATING COATING

CROSS-REFERENCE TO RELATED APPLICATIONS

This application claims the benefit under 35 U.S.C. §119(e) of U.S. Provisional Patent Application No. 61/904,808, filed Nov. 15, 2013, which application is incorporated herein by reference in its entirety.

TECHNICAL FIELD

The present disclosure relates to a bearing cage with an inner or outer circumferential surface with a self-lubricating coating of molybdenum disulfide or polytetrafluoroethylene. The present disclosure relates to a method of manufacturing a bearing cage with an inner or outer circumferential surface with a self-lubricating coating of molybdenum disulfide or polytetrafluoroethylene. The present disclosure relates to a bearing assembly including a bearing cage with a self-lubricating coating of molybdenum disulfide or polytetrafluoroethylene.

BACKGROUND

It is known to use spindle bearings with phenolic cages for high-speed applications such as machine tools. Such spindle bearings typically have inner and outer rings, the phenolic bearing cage radially located between the inner and outer rings, and a plurality of roller elements retained by the bearing ring. In a radially outwardly guided configuration, an outer circumferential surface of the bearing cage (the land guiding surface) is engaged with and guided by an inner circumferential surface of the outer ring (land surface). Oil from bearing grease or similar lubricant forms a lubricant film between the land guiding surface and the land surface. In a radially inwardly guided configuration, an inner circumferential surface of the bearing cage (the land guiding surface) is engaged with and guided by an outer circumferential surface of the inner ring (land surface).

Oil from the bearing grease or similar lubricant forms a lubricant film between the land guiding surface and the land surface. Lubrication of the land guiding surface is critical for operation of the bearing. However, at start up, the lubricant film is not yet fully formed between the land surface and the land guiding surface and base oil has only starting to migrate to the land guiding surface. Known spindle bearings do not provide a desired level of lubrication of the land guiding surface at start up.

EP 0 695 884 B1 discloses a greased rolling bearing element with a solid lubricating coating. The description of EP 0 695 884 B1 mentions GB 826 091 A, which described cages with metallic bodies and a plastic coating of polyamide or poly tetrafluoroethylene containing about 3% of $MoS_2$ or graphite.

The description of EP 0 695 884 B1 mentions U.S. Pat. No. 3,500,525, JP-A-62 141 314 and JP-A-3 255 223, all of which disclose a coating of $MoS_2$ for a bearing cage. However, all these references relate to bearings for use in (high) vacuum and/or at elevated temperatures (250° C. or more). Grease lubrication cannot be used in (high) vacuum and/or at elevated temperatures.

EP 0 695 884 B1 discloses use of a coating of $MoS_2$ and poly tetrafluoroethylene over a steel bearing cage.

SUMMARY

According to aspects illustrated herein, there is provided a bearing cage, including: a body fabricated of phenolic material and having an outer circumferential surface and an inner circumferential surface; and a coating of molybdenum disulfide or polytetrafluoroethylene adhered to the outer circumferential surface or the inner circumferential surface.

According to aspects illustrated herein, there is provided a bearing assembly including: an inner ring including a first outer circumferential surface; an outer ring including a first inner circumferential surface; a bearing cage fabricated of phenolic material and including first and second sides, a second outer circumferential surface connecting the first and second sides, a second inner circumferential surface connecting the first and second sides, and a coating of molybdenum disulfide or polytetrafluoroethylene adhered to the second outer circumferential surface or to the second inner circumferential surface; and a plurality of rolling elements retained by the bearing cage. The second outer circumferential surface is engaged with the first inner circumferential surface to guide the bearing cage. The second inner circumferential surface is engaged with the first outer circumferential surface to guide the bearing cage.

According to aspects illustrated herein, there is provided a method of manufacturing a bearing cage, including: fabricating a body from phenolic material, the body including an outer circumferential surface and an inner circumferential surface connecting first and second sides; and adhering a coating of molybdenum disulfide or polytetrafluoroethylene to the inner or outer circumferential surface.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
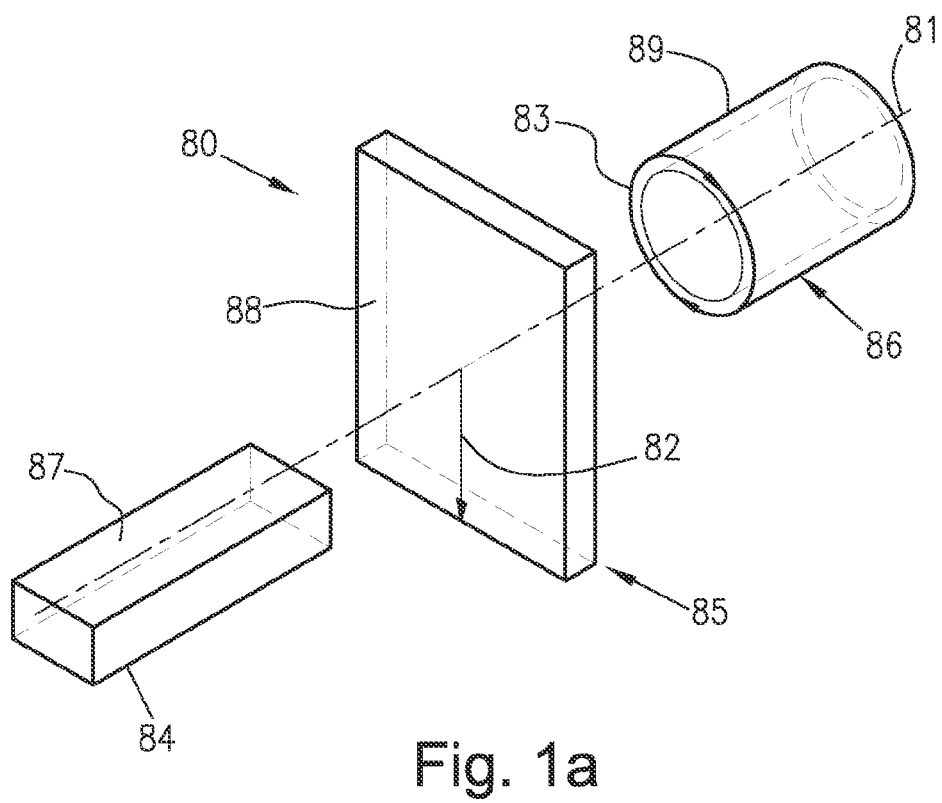
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present disclosure is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
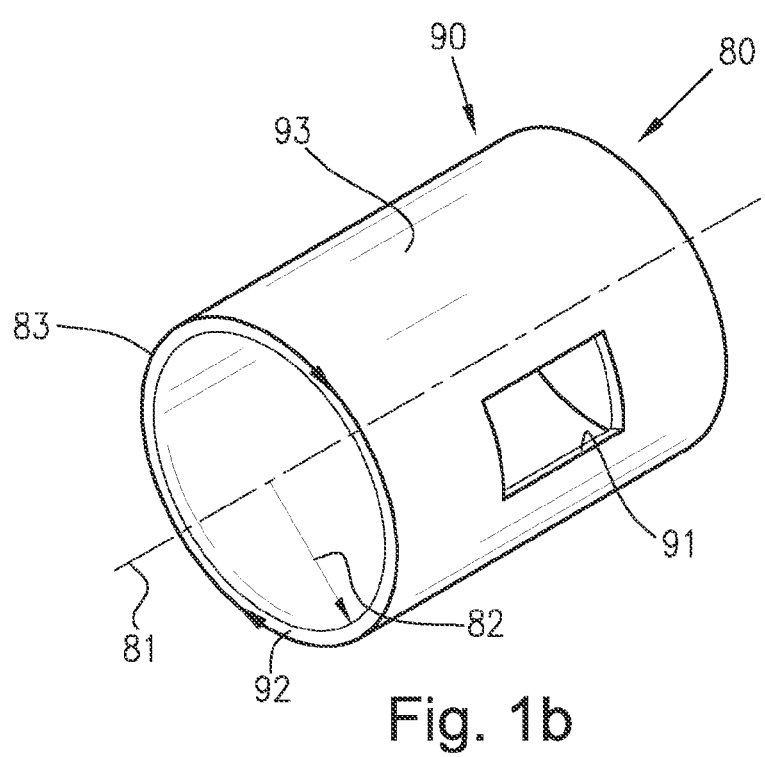
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
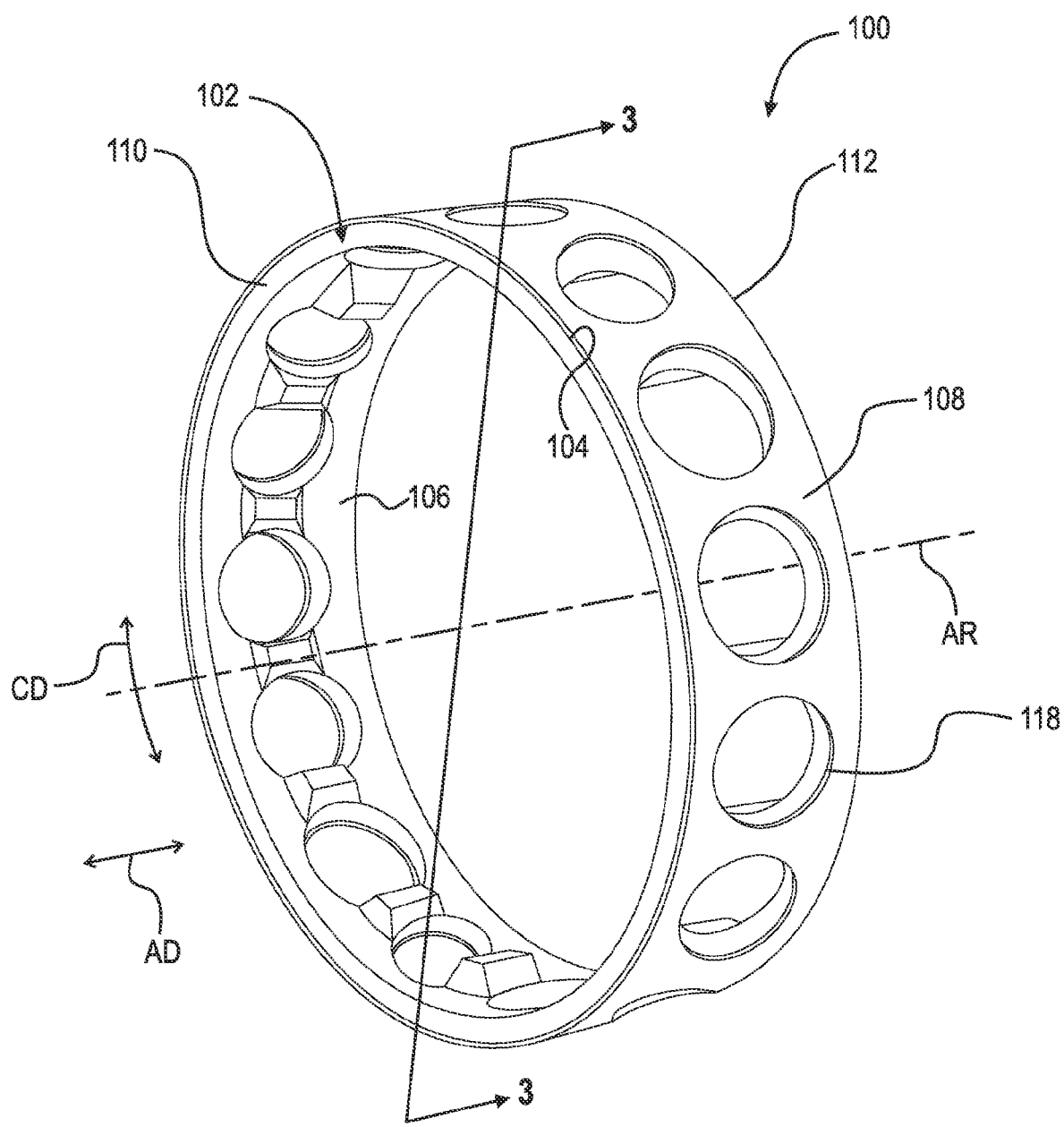
FIG. 2 is a perspective view of a bearing cage with a self-lubricating coating on an outer circumference.

FIG. 2 is a perspective view of bearing cage 100 with a self-lubricating coating on an outer circumference.

Figure 3:
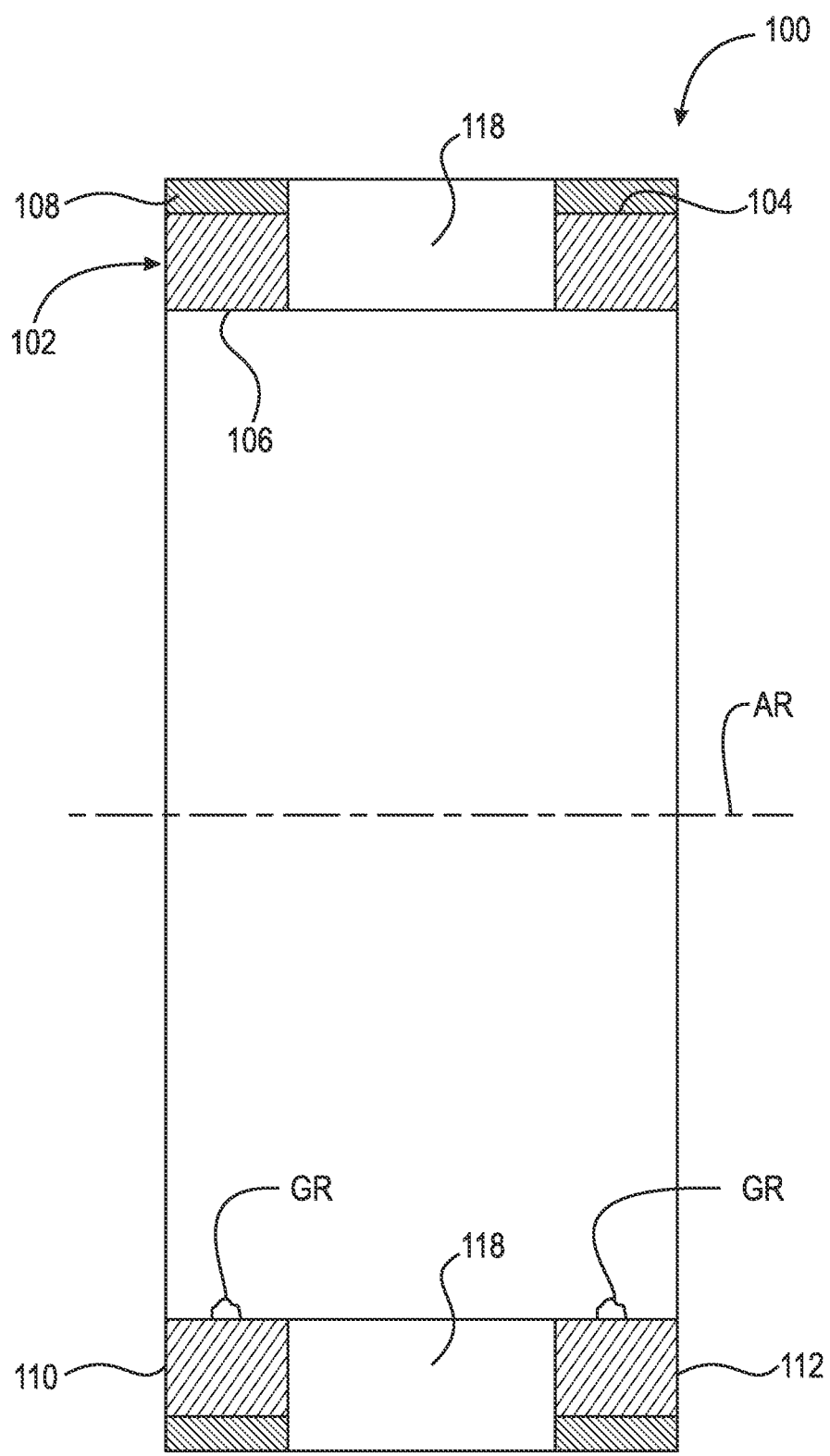
FIG. 3 a schematic cross-sectional view generally along line 3-3 in FIG. 2.

FIG. 3 a cross-sectional view generally along line 3-3 in FIG. 2. The following should be viewed in light of FIGS. 2 and 3. Cage 100 includes axis of rotation AR and body 102 fabricated of phenolic material and having outer circumferential surface 104 and inner circumferential surface 106. Body 102 can be fabricated of any phenolic material known in the art. Cage 100 includes coating 108 of molybdenum disulfide or polytetrafluoroethylene adhered to outer circumferential surface 104. That is, surface 104 is at least partially covered with coating 108. In an example embodiment, the coating is molybdenum disulfide. In an example embodiment, the coating is polytetrafluoroethylene. In an example embodiment, cage 100 includes grease GR. Grease GR is generally located proximate surface 106. The thickness of coating 108 in FIGS. 2 and 3 has been exaggerated for purposes of illustration.

In an example embodiment, at least a portion of the coating forms a continuous ring, in circumferential direction CD, encircling surface 104. In an example embodiment, an entirety, that is, all of the coating is continuous in circumferential direction CD on surface 104. Body 102 includes sides 110 and 112. Outer circumferential surface 104 and inner circumferential surfaces 106 connect sides 110 and 112. That is, sides 110 and 112 bound the outer circumferential surface and the inner circumferential surface in axial direction AD. In an example embodiment, at least a portion of coating 108 is continuous from side 110 to side 112, that is, between side 110 and 112. In an example embodiment, an entirety, that is, all, of coating 108 is continuous from side 110 to side 112, that is, between side 110 and 112. Stated otherwise, surface 104 is completely covered with coating 108.

Figure 4:
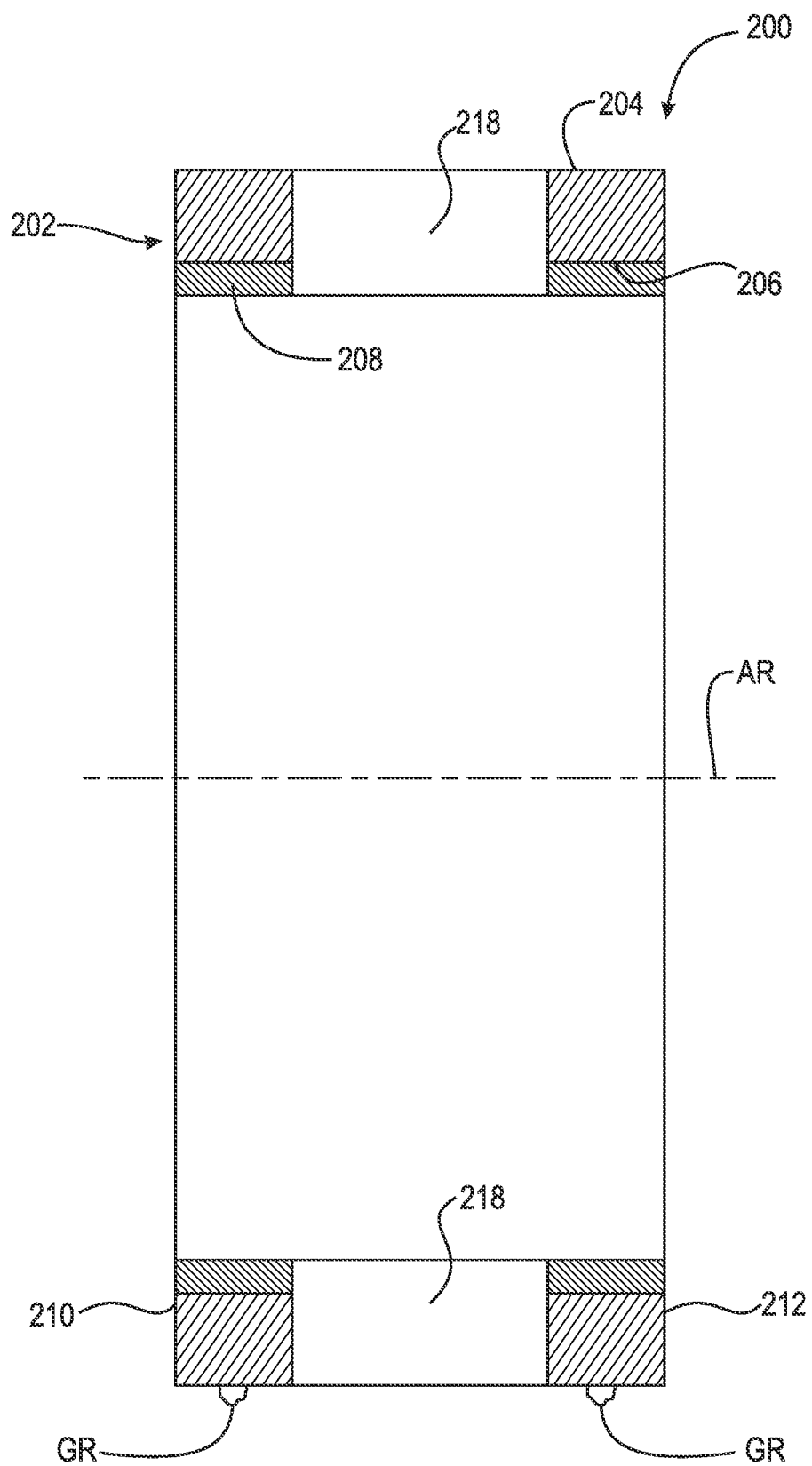
FIG. 4 is a schematic cross-sectional view of a bearing cage with a coating on an inner circumferential surface; and, FIG. 5 is a partial cut-away view of a bearing assembly including a bearing cage with a self-lubricating coating on an outer circumference.

FIG. 4 is a schematic cross-sectional view of bearing cage 200 with a coating on an inner circumferential surface. Cage 200 includes axis of rotation AR and body 202 fabricated of phenolic material and with outer circumferential surface 204 and inner circumferential surface 206. Body 202 can be fabricated of any phenolic material known in the art. Cage 200 includes coating 208 of molybdenum disulfide or polytetrafluoroethylene adhered to inner circumferential surface 206. That is, surface 206 is at least partially covered with coating 208. In an example embodiment, the coating is molybdenum disulfide. In an example embodiment, the coating is polytetrafluoroethylene. In an example embodiment, cage 200 includes grease GR. Grease GR is generally located proximate surface 204. The thickness of coating 208 has been exaggerated for purposes of illustration.

In an example embodiment, at least a portion of the coating forms a continuous ring in circumferential direction CD encircling surface 206. In an example embodiment, an entirety, that is, all of the coating is continuous in circumferential direction CD on surface 206. Body 202 includes sides 210 and 212. Outer circumferential surface 204 and inner circumferential surfaces 206 connect sides 210 and 212. That is, sides 210 and 212 bound the outer circumferential surface and the inner circumferential surface in axial direction AD. In an example embodiment, at least a portion of coating 208 is continuous from side 210 to side 212, that is, between side 210 and 212. In an example embodiment, an entirety, that is, all, of coating 208 is continuous from side 210 to side 212, that is, between side 210 and 212. Stated otherwise, surface 206 is completely covered with coating 608.

Figure 5:
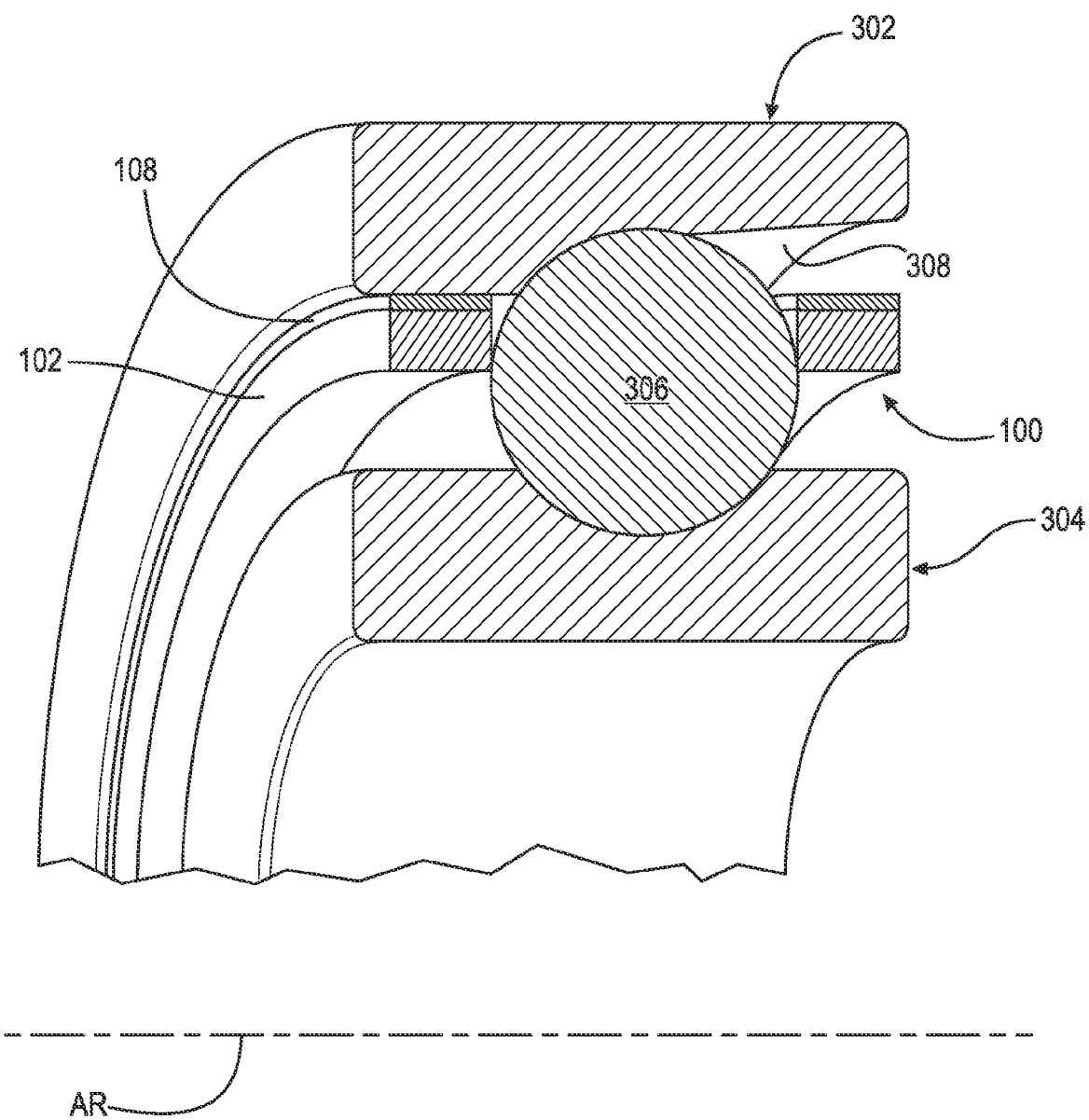

FIG. 5 is a partial cut-away view of bearing assembly 300 including bearing cage 100 with a self-lubricating coating on an outer circumference. The following should be viewed in light of FIGS. 2, 3 and 5. Assembly 300 includes axis of rotation AR, bearing cage 100, outer ring 302, inner ring 304, and at least one rolling element 306. Ring 302 includes inner circumferential surface 308, also referred to as land surface 308. Outer circumferential surface 104 engages surface 308.

Advantageously, bearings 100 and 200 addresses the problems noted above regarding the lack of lubrication on the surface of a bearing cage during start-up. Specifically, coatings 108 and 208 provide effective friction reduction prior to the build up of oil on surfaces 104 and 206, respectively. There are no teachings, suggestions, or motivations in the prior art to use coating 108 on a phenolic bearing cage or that the use of coating 108 on a phenolic bearing cage would be successful.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A bearing cage, comprising:
a body:
fabricated of phenolic material; and,
including an outer circumferential surface and an inner circumferential surface; and,
a coating of molybdenum disulfide or polytetrafluoroethylene adhered to the outer circumferential surface or the inner circumferential surface, wherein:
for the coating of molybdenum disulfide or polytetrafluoroethylene adhered to the outer circumferential surface, the bearing cage includes an oil-based lubricant on the inner circumferential surface; and,
for the coating of molybdenum disulfide or polytetrafluoroethylene adhered to the inner circumferential surface, the bearing cage includes an oil-based lubricant on the outer circumferential surface.

2. The bearing cage of claim 1, wherein:
the outer circumferential surface is arranged to engage an outer ring for a bearing assembly; or,
the inner circumferential surface is arranged to engage an inner ring for a bearing assembly.

3. The bearing cage of claim 1, wherein:
at least a portion of the coating forms a continuous ring completely encircling the inner circumferential surface in a circumferential direction; or,
at least a portion of the coating forms a continuous ring completely encircling the outer circumferential surface in a circumferential direction.

4. The bearing cage of claim 1, wherein:
the body includes first and second sides bounding the inner and outer circumferential surfaces in an axial direction; and,
at least a portion of the coating is continuous between the first and second sides.

5. The bearing cage of claim 1, wherein:
the body includes first and second sides bounding the inner and outer circumferential surfaces in an axial direction; and,
an entirety of the coating is continuous between the first and second sides.

6. A bearing assembly comprising:
an inner ring including a first outer circumferential surface;
an outer ring including a first inner circumferential surface;
a bearing cage fabricated of phenolic material and including:
first second, third and fourth sides;
a second outer circumferential surface connecting the first and second sides;
a second inner circumferential surface connecting the first and second sides; and
a third outer circumferential surface connecting the third and fourth sides; and,
a coating of only molybdenum disulfide or polytetrafluoroethylene adhered to the second outer circumferential surface; and,
a plurality of rolling elements:
axially located between the second and third outer circumferential surfaces; and,
retained by the bearing cage, wherein:
the coating is in contact with the first inner circumferential surface to guide the bearing cage; and
the coating is free of contact with the first inner circumferential surface.

7. The bearing assembly of claim 6, further comprising grease applied to the bearing cage.

8. The bearing assembly of claim 6, further comprising an oil-based lubricant applied to the bearing cage.

9. A method of manufacturing a bearing cage, comprising:
fabricating a body from phenolic material, the body including an outer circumferential surface and an inner circumferential surface connecting first and second sides; and,
adhering a coating of molybdenum disulfide or polytetrafluoroethylene to the inner circumferential surface and an oil-based lubricant to the outer circumferential surface; or,
adhering a coating of molybdenum disulfide or polytetrafluoroethylene to the outer circumferential surface and an oil-based lubricant to the inner circumferential surface.

10. The method of claim 9, wherein:
adhering the coating of molybdenum disulfide or polytetrafluoroethylene to the inner circumferential surface includes adhering only molybdenum disulfide; or,
adhering the coating of molybdenum disulfide or polytetrafluoroethylene to the outer circumferential surface includes adhering only molybdenum disulfide.

11. The method of claim 9, wherein:
adhering the coating of molybdenum disulfide or polytetrafluoroethylene to the inner circumferential surface includes adhering only polytetrafluoroethylene; and,
adhering the coating of molybdenum disulfide or polytetrafluoroethylene to the outer —circumferential surface includes adhering only polytetrafluoroethylene.

* * * * *